United States Patent
Spalink

(10) Patent No.: US 8,203,528 B2
(45) Date of Patent: Jun. 19, 2012

(54) MOTION ACTIVATED USER INTERFACE FOR MOBILE COMMUNICATIONS DEVICE

(75) Inventor: Karin Spalink, Durham, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1198 days.

(21) Appl. No.: 11/955,517

(22) Filed: Dec. 13, 2007

(65) Prior Publication Data

US 2009/0153341 A1   Jun. 18, 2009

(51) Int. Cl.
*G09G 5/00* (2006.01)
(52) U.S. Cl. ............... 345/156; 348/211.2; 455/422.1
(58) Field of Classification Search .......... 345/156, 345/169; 348/211.2, 211.99; 455/422.1, 455/403, 575.3
See application file for complete search history.

(56) References Cited

U.S. PATENT DOCUMENTS

| | | | |
|---|---|---|---|
| 6,466,198 B1 | 10/2002 | Feinstein | |
| 7,538,818 B2 * | 5/2009 | Sawachi | 348/372 |
| 7,791,594 B2 * | 9/2010 | Dunko | 345/173 |
| 7,792,298 B2 * | 9/2010 | Silverbrook et al. | 380/270 |
| 2005/0212767 A1 | 9/2005 | Marvit et al. | |
| 2006/0028429 A1 | 2/2006 | Kanevsky et al. | |

* cited by examiner

*Primary Examiner* — Abbas Abdulselam
(74) *Attorney, Agent, or Firm* — Snyder, Clark, Lesch & Chung, LLP

(57) ABSTRACT

Disclosed is a system for interpreting motion of a mobile communications device as input to the mobile communications device. The system includes a processor for executing the various software components, a display, a microphone, a speaker, storage means for storing one or more motions and associated actions, a motion detecting device, and a sensing and interpretation application. The sensing and interpretation application detects motion of the mobile communications device via the motion detecting device. It then determines the current mode of the mobile communications device and compares the detected motion against a database of motions. Each stored motion is associated with a mode and an action to be performed by the mobile communications device. Upon finding a match between the detected motion and a motion in the storage means, the action associated with the detected motion and the current mode of the mobile communications device is performed.

15 Claims, 5 Drawing Sheets

(a)

(b)

(c)

(d)

(e)

(a)          (b)

MOTION ACTIVATED USER INTERFACE FOR MOBILE COMMUNICATIONS DEVICE

SUMMARY

Disclosed is a method and system for interpreting motion of a mobile communications device as input to the mobile communications device. The system includes a processor for executing the various software components of the mobile communications device, a display coupled with the processor, a microphone coupled with the processor for recording audio, a speaker coupled with the processor for outputting audio, storage means coupled with the processor for storing one or more motions and associated actions, a motion detecting device such as, for instance, an accelerometer coupled with the processor, ad a sensing and interpretation application coupled with the processor.

The sensing and interpretation application detects a specific type of motion with respect to the mobile communications device via the motion detecting device. It then determines the current mode of the mobile communications device and compares the detected motion against a database of motions in the storage means. Each stored motion is associated with a mode of the mobile communications device and an action to be performed by the mobile communications device. Upon finding a match, within tolerable limits, between the detected motion and a motion in the storage means, the action associated with the detected motion and the current mode of the mobile communications device is performed.

The sensing and interpretation application can also train the mobile communications device to recognize a specific motion. It does this by selecting a mode to be associated with a specific motion and selecting an action to be performed within the selected mode. Next, the sensing and interpretation application detects a user defined motion of the mobile communications device via the motion detecting device. The detected motion is then associated with the selected mode and the selected action and stored away.

The system and method can also utilize a text-to-speech engine to convert text strings that can be associated with an action to audible output that can be output by the speaker.

The mode of the mobile communications device can include, among others, one of a phone mode, a picture mode, a music mode, a game mode, camera mode, a contacts mode, a settings mode, and a null mode. The null mode acts as a superseding mode such that any motions and actions associated within the null mode supersede motions and actions in other modes.

DETAILED DESCRIPTION OF THE INVENTION

Figure 1:
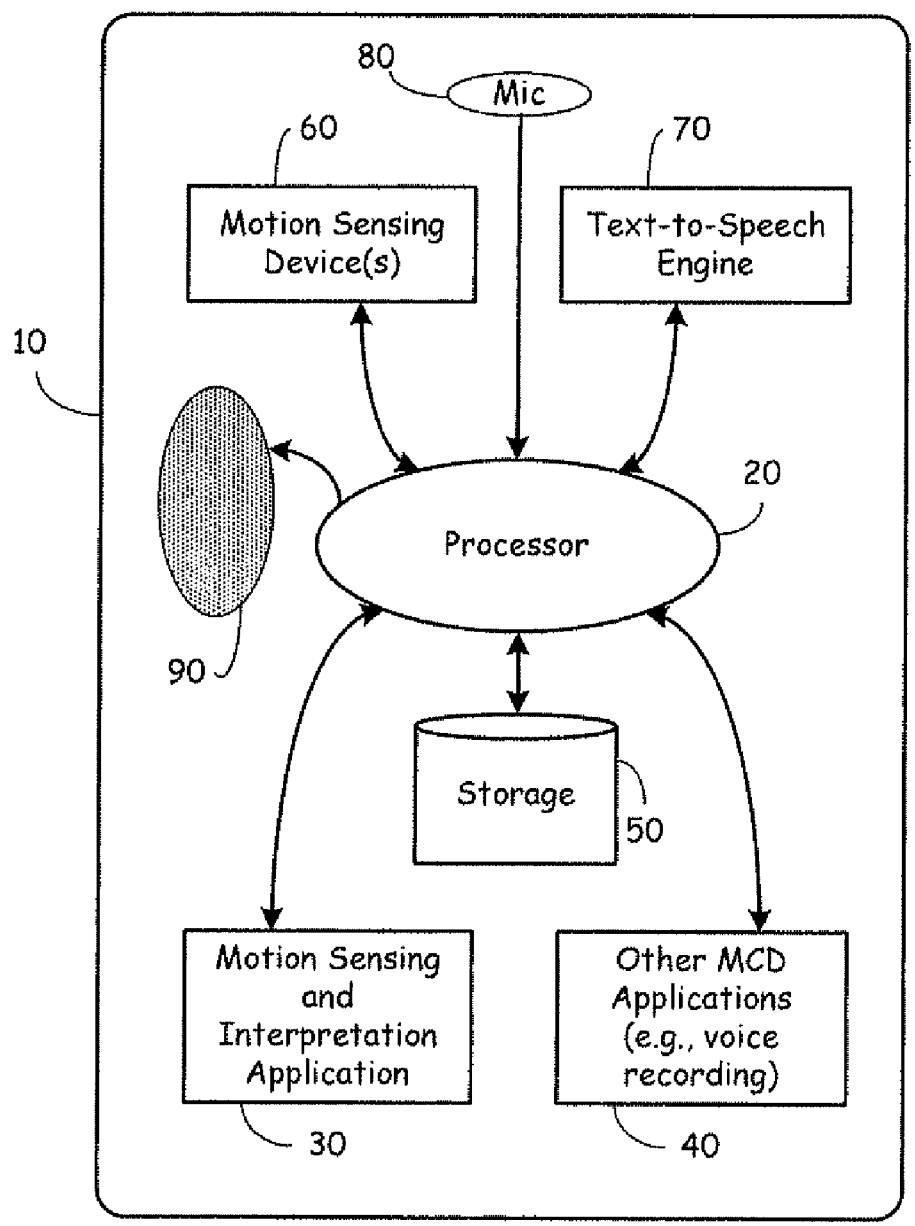
FIG. 1 is an illustration of some of the internal components of a mobile communications device.

FIG. 1 is an illustration of some of the internal components of a mobile communications device 10. Within the mobile communications device 10 there are included several components that operate to practice the embodiments of the invention. Not all the components that comprise a mobile communications device 10 are illustrated, however.

A processor 20 serves to coordinate and control the operations and interactions among the various components. Among the various components, there is shown a motion sensing and interpretation application 30, other mobile communications device applications 40 (e.g., voice recognition, contacts, games, etc.), internal (and/or removable) storage 50, motion sensing devices 60, a text-to-speech engine 70, a microphone 80, and a speaker 90.

The motion sensing and interpretation application 30 includes the software and software interfaces for managing sensed motion and the responses thereto. The motion sensing and interpretation application 30 further includes training responses to be associated with specified motions.

Other mobile communications device applications 40 generally include the other applications of the mobile communications device that can be influenced by or operated on by the motion sensing and interpretation application 30. For instance, the application that answers the phone can be altered to accept sensed motion as a means for answering and disconnecting a phone call. In another example, an application for displaying pictures can be made to display the next picture of a series (e.g., slideshow) using a shaking motion such as a flick of one's wrist. There are numerous other examples involving other mobile communications device applications 40 that can be integrated to accept motion as a source of input.

The internal (and/or removable) storage 50 serves to store data associated with the motion sensing and interpretation application 30 such as, for instance, a library of stored motions that are linked with mobile communications device modes and operations/tasks. The motion sensing devices 60 can include at least one or more accelerometer devices used to detect motion of the mobile communications device. The text-to-speech engine 70 can be included to convert text data to verbal output. Text data can be associated with a sensed motion and converted to speech upon recognition of the motion. The converted speech can then be output via speaker 90.

The microphone 80 can be used to record words or phrases that can be associated with sensed motion and output via speaker 90 when the associated motion is sensed and identified. For instance, if the mobile communications device were to be dropped and hit the floor, it could output the word "ouch!" upon or just after impact if the motion sensed was defined and indicative of a dropped mobile communications device.

Figure 2:
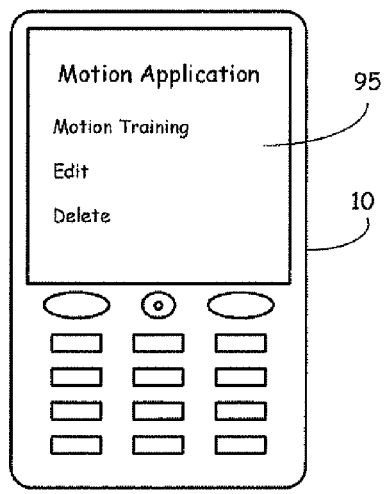
FIG. 2 is a sample screen shot describing aspects of embodiments according to the present invention.

FIG. 2 is a sample screen shot describing aspects of embodiments according to the present invention. In this illustration, the mobile communications device 10 is displaying 95 three of the functions (motion training, editing, and deleting) available to the motion sensing and interpretation application 30. A user can scroll and select from among the list shown 95.

Figure 3:
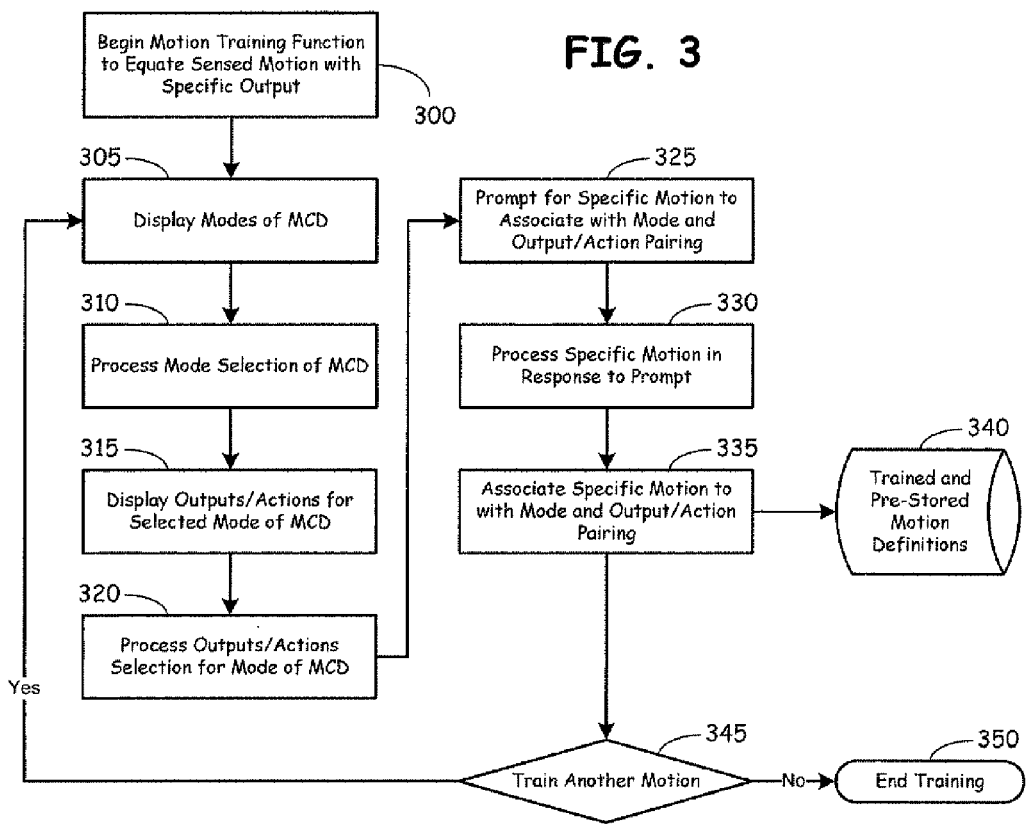
FIG. 3 is a flow chart or logic diagram describing motion training aspects of embodiments according to the present invention.

FIG. 3 is a flow chart or logic diagram describing motion training aspects of embodiments according to the present invention. One of the functions of the motion sensing and interpretation application 30 is to learn motions and associate them with actions or outputs. This can sometimes be referred to as a training function.

Motion training begins 300 when is shown the several modes 305 of the mobile communications device. Modes can include, but are not limited to, phone mode, camera mode (if the mobile communications device has an integrated camera), music mode (if the mobile communications device has an integrated music player, game mode, picture mode, contacts mode, settings mode, and a null mode, etc.

The null mode can include more irreverent actions such as "phone drop" or "phone toss". While the mobile communications device is in a particular mode, sensed motion will have a meaning specific to that mode. This allows for the same sensed motion to be used in different modes. However, if an action is defined for a null mode the action will be performed when the specified motion is detected regardless of the current mode. Thus, actions associated with the null mode should not be associated with any other mode as null mode acts as a superseding mode with respect to detected motion. Examples of motions for the null mode include dropping the mobile communications device and tossing the mobile communications device into the air. Examples of actions associated with dropping the mobile communications device or tossing the mobile communications device in the air include an audible "ouch" or an audible "wheeee" respectively.

Once the mobile communications device processes a user's mode selection 310, a list of outputs/actions is generated for that mode 315. Phone mode, for instance, can include outputs/actions such as "answer", "hang up", "mute", "volume up/down", "call waiting answer", etc. Other modes will have outputs/actions that apply to their mode. A user will select an output/action 320. The mobile communications device will then prompt the user to create a motion that is to be associated with the mode action/output pairing 325. The mobile communications device then processes the motion supplied by the user in response to the prompt 330. The motion is then associated with the mode action/output pairing 335 and stored in a database of motion definitions 340. The user is prompted whether to train another motion 345. If the response is "no" training ends 350. Otherwise, control is returned to process 305 and the user is shown the list of modes.

It is also anticipated that several motions may have pre-defined or canned mode and output/action associations stored in memory. If so, these can be edited by the user if desired according to the procedures set out below.

Figure 4:
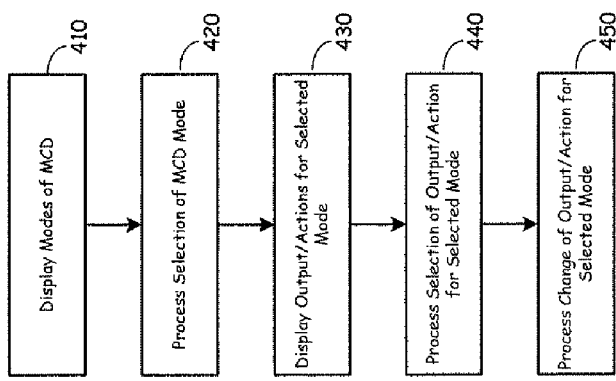
FIG. 4 is a flow chart or logic diagram describing motion editing aspects of embodiments according to the present invention.

FIG. 4 is a flow chart or logic diagram describing motion editing aspects of embodiments according to the present invention. The user may also edit an existing mode/motion pairing by selecting from a displayed list of modes for the mobile communications device 410. The mobile communications device will process the selection 420 and display a list of outputs/actions for the selected mode 430 obtained from the database of defined motions. The user selects from the list and the mobile communications device will process the selection of the action/output 440 by allowing the user to change 450 the output/action for the selected motion.

Figure 5:
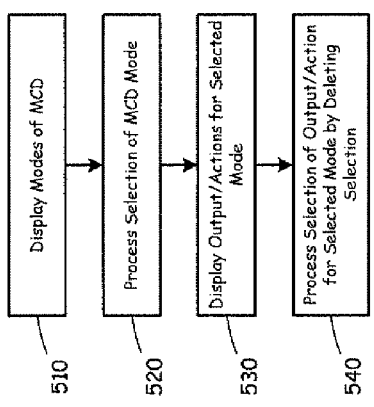
FIG. 5 is a flow chart or logic diagram describing motion deleting aspects of embodiments according to the present invention.

FIG. 5 is a flow chart or logic diagram describing motion deleting aspects of embodiments according to the present invention. The user may also delete an existing mode/motion pairing by selecting from a displayed list of modes for the mobile communications device 510. The mobile communications device will process the selection 520 and display a list of outputs/actions for the selected mode 530 obtained from the database of defined motions. The user selects from the list and the mobile communications device will process the selection of the action/output by deleting the output/action for the selected motion 540.

Figure 6:
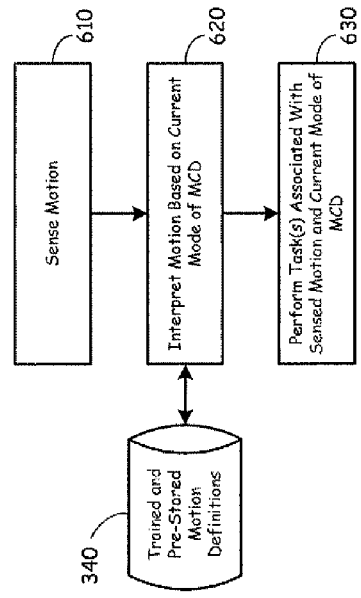
FIG. 6 is a flow chart or logic diagram describing operational aspects of embodiments according to the present invention.

FIG. 6 is a flow chart or logic diagram describing operational aspects of embodiments according to the present invention. When the motion sensing and interpretation application 30 is active, motion is continuously being sensed 610 and interpreted 620 based on the current mode of the mobile communications device. When motion for a mode is sensed that has a defined output/action stored 340, the mobile communications device will cause the defined output/action to occur 630. Upon completion of the output/action, the motion sensing and interpretation application 30 returns to its vigilant state where it processes subsequent motion searching for matches based on mode and motion.

The types of actions and/or outputs that can be associated with detected motion can include, but are not limited to, audible output via the speaker, visual output via the display, mechanical output such as vibration, and launching an application and/or performing a command within an application. Audible output can be based on pre-recorded sounds, words, phrases as well as links to other audio files such as music files. Audible output can also include text-to-speech conversions of text data. Visual output can include, but is not limited to, graphical imagery on the display such as color and design bursts and links to image files that can be displayed. Visual output can also include events not associated with the display such as flashing the lights associated with the keys of the keypad as well as any other lights visible on the mobile communications device that are not associated with the display.

To help illustrate the scope of the present invention, several illustrative embodiment examples are presented that indicate some, but not all of, the capabilities of the present invention.

Figure 7:
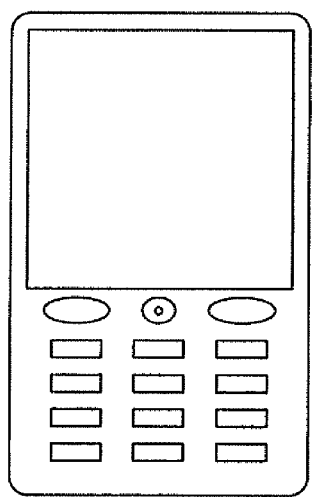
FIG. 7 illustrates a flip-type of motion that can be defined and recognized by embodiments according to the present invention.
Figure 7:
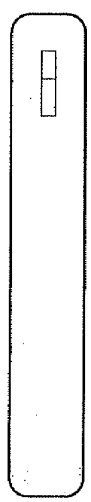
Figure 7:
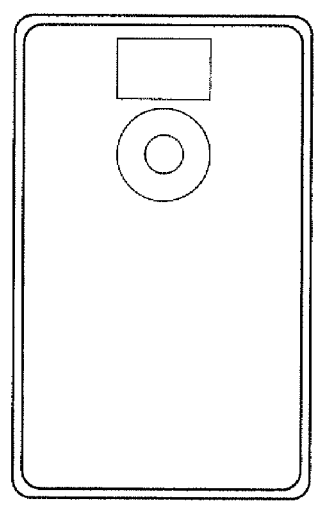
Figure 7:
Figure 7:
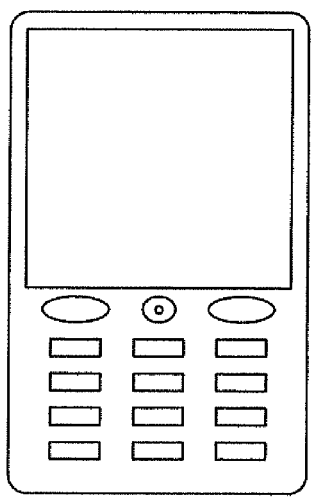

FIG. 7 illustrates a flip-type of motion that can be defined and recognized by embodiments according to the present invention. In this example, an mobile communications device is shown in five consecutive states (a)-(e) to indicate a flip-type motion. In state (a) the mobile communications device is shown face forward. In state (b) the mobile communications device is shown rotated (or flipped) 90° such that it is in a profile mode. In state (c) the mobile communications device is shown face down having been rotated another 90°. In state (d) the mobile communications device is shown rotated (or flipped) another 90° such that it is in a second opposite profile mode. Lastly, in state (e) the mobile communications device is shown rotated (or flipped) 90° again such that it is returned to face front. This sequence or progression can be associated with an output/action for one or more modes. Moreover, the motion can be broken down into 90° intervals such that each quarter turn can have its own associated mode/motion definition.

Figure 8:
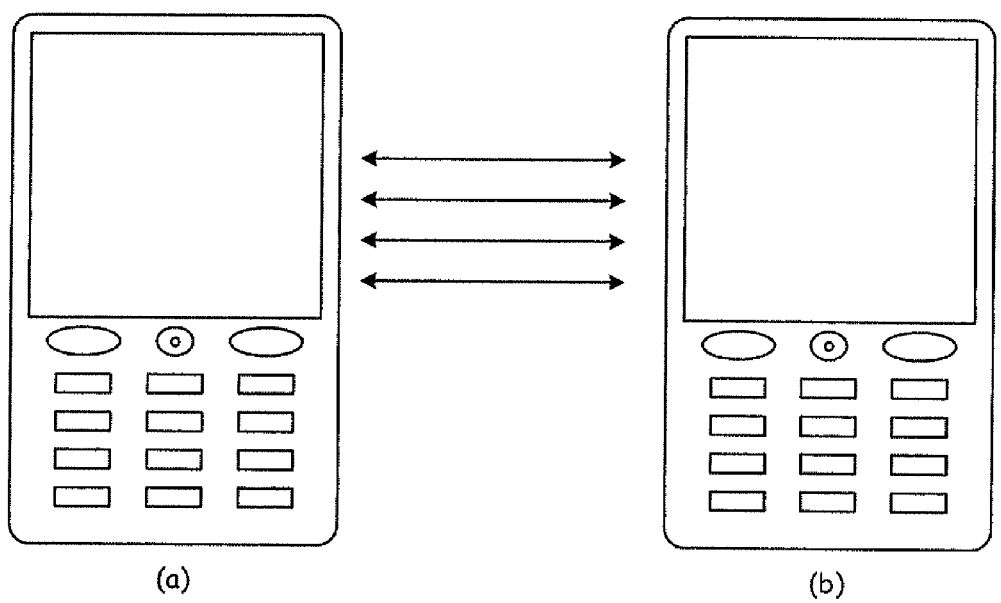
FIG. 8 illustrates a shaking motion that can be defined and recognized by embodiments according to the present invention.

FIG. 8 illustrates a shaking motion that can be defined and recognized by embodiments according to the present invention. The arrows between the mobile communications device's in this illustration indicate a back and forth motion between state (a) and state (b). This back and forth motion can be termed "shaking" and can be associated with an output/action for one or more modes.

Figure 9:
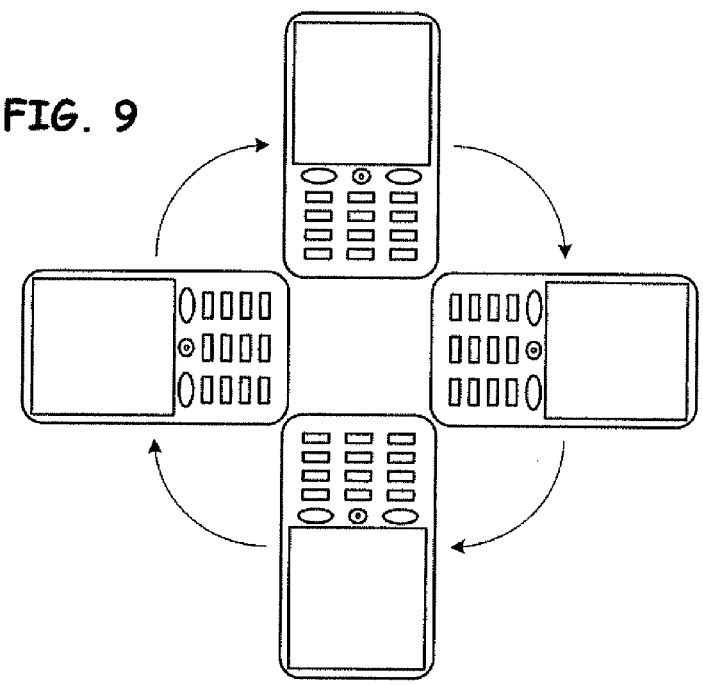
FIG. 9 illustrates a spinning motion that can be defined and recognized by embodiments according to the present invention.

FIG. 9 illustrates a spinning motion that can be defined and recognized by embodiments according to the present invention. In this example, the mobile communications device starts out oriented face front with a standard top/bottom orientation. As it is rotated (spun), the mobile communications device's orientation is continuously changing as it traverses an arc and eventually comes full circle. The speed of the rotation can be varied.

The motion sensing and interpretation application 30 can be used for functional and personalization applications. Functional applications include using motion as a user input device to answer the phone, for instance. Personalization applications can include having the phone make quirky sounds or change display characteristics based on sensed motions. For instance, if the user drops his phone it can be made to say "Ouch!" upon or just after impact while the display can be made to show an explosion of some sort.

While FIGS. 7-9 have described types of motion that can be defined and used in the embodiments of the present invention, it is important to note that the embodiments of the present invention are not limited to just these motions. They are merely exemplary to help describe aspects of the present invention. For instance, motions can be detected and interpreted in two and three dimensions. Moreover, motion such as knocking the mobile communications device against a hard surface can be detected and interpreted similar to knocking one's hand on a door. Thus, there are numerous types of motion that can be detected and interpreted by the embodiments of the present invention and the examples described herein are not intended to be limiting.

An example of a game or game mode application could be the game of Roulette. Roulette is a casino game in which a large numbered and colored slotted disk is spun around while a small metal ball bounces around the disk until the disk comes to rest and the ball rests within one of the numbered/colored slots. The object of the game is to guess the number and/or color of the slot in which the ball will come to rest.

The mobile communications device can be made to simulate the game by spinning the mobile communications device on a table top. The spinning motion, in this particular mode, will cause a bouncing ball sound and rapid click sound indicative of the sounds made in Roulette. As the spinning begins to ebb, the sounds will do the same. Once the motion stops, the final action/output is to have the mobile communications device randomly select one of the Roulette numbers and its associated color. The selection can be displayed by the mobile communications device using the color as a background for the number.

In picture mode, the mobile communications device can use detected motion to perform various functions. For instance, if the user shakes the mobile communications device once it could indicate "display the next picture". Two shakes could indicate "zoom in". Flipping the mobile communications device over to its back could indicate "exit picture mode".

Another example of personalization could be a phone toss. The motion associated with an mobile communications device hurtling through the air can be detected and associated with a pre-recorded audio output such as "Wheeeeee".

If the mobile communications device includes a text-to-speech engine, written data can be converted to audible output and associated with a specific motion. For instance, suppose the motion detected is indicative of a sudden or violent change. The mobile communications device can be programmed with a text question such as "Are you alright?" If the mobile communications device further contains a voice recognition (VR) engine and software, it can process the user's response if it is simple enough. If the user responds "No.", the mobile communications device can interpret and then ask, "Should I dial 9-1-1?" If the user responds, "Yes" the mobile communications device can initiate the emergency phone call.

The foregoing are a small sampling of the types of motion and the associated responses thereto that can be implemented for these and other examples under the various embodiments of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any prompts associated with the present invention may be presented and responded to via a graphical user interface (GUI) presented on the display of the mobile communications device or the like. Prompts may also be audible, vibrating, etc.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A method of interpreting motion of a mobile communications device as input to the mobile communications device, the method comprising:
   detecting a specific type of motion with respect to the mobile communications device;
   determining a current mode of the mobile communications device;
   comparing the detected motion against a stored database of motions where each stored motion is associated with a mode of the mobile communications device and an action to be performed by the mobile communications device;
   wherein determining the current mode of the mobile communication device precedes comparing the detected motion against the stored database of motions; and
   upon finding a match, within tolerable limits, between the detected motion and a motion in the stored database of motions, performing the action with the detected motion and the current mode of the mobile communication device; and
   training the mobile communications device to recognize a specific motion, where the training comprises:
      selecting a mode to be associated with a specific motion;
      selecting an action to be performed within the selected mode;
      detecting a motion of the mobile communications device, where the motion is user defined;
      associating the detected motion with the selected mode and the selected action; and
      storing the associated detected motion with the selected mode and the selected action in the stored database of motions.

2. The method of claim 1, where motion is detected using an accelerometer within the mobile communications device.

3. A non-transitory computer readable medium storing a computer program product for interpreting motion of a mobile communications device as input to the mobile communications device, the non-transitory computer readable medium comprising:
   computer program code for detecting a specific type of motion with respect to the mobile communications device;
   computer program code for determining a current mode of the mobile communications device;
   computer program code for comparing the detected motion against a stored database of motions where each stored motion is associated with a mode of the mobile communications device and an action to be performed by the mobile communications device,
   wherein determining the current more of the mobile communication device precedes comparing the detected motion against the stored database of motions,
   where the mode includes one of: a phone mode, a picture mode, a music mode, a game mode, camera mode, a contacts mode, a settings mode, or a null mode, and
   where an actions includes one of: a command or instruction that can be issued by an application within the mobile communications device, an audible output based on a recorded audio file, an audible output based on a text-to-speech conversion, a visual output, or a mechanical output; and upon finding a match, within tolerable limits, between the detected motion and a motion in the stored database of motions, computer program code for performing the action associated with the detected motion and the current mode of the mobile communications device.

4. The non-transitory computer readable medium of claim 3, further comprising:
computer program code for training the mobile communications device to recognize a specific motion, where the computer program code for training comprises:
computer program code for selecting a mode to be associated with a specific motion;
computer program code for selecting an action to be performed within the selected mode, where an action includes one of: an audible output based on a recorded audio file, an audible output based on a text-to-speech conversion, a visual output, or a mechanical output;
computer program code for detecting a motion of the mobile communications device, where the motion is user defined;
computer program code for associating the detected motion with the selected mode and the selected action; and
computer program code for storing the associated detected motion with the selected mode and the selected action in the stored database of motions.

5. The non-transitory computer readable medium of claim 4, where the null mode acts as a superseding mode such that any motions and actions associated within the null mode supersede motions and actions in other modes.

6. The non-transitory computer readable medium of claim 3, where motion is detected using an accelerometer within the mobile communications device.

7. A system for interpreting motion of a mobile communications device as input to the mobile communications device, the system comprising:
a processor to execute the various software components of the mobile communications device;
a display coupled with the processor;
a microphone, coupled with the processor, to record audio;
a speaker, coupled with the processor, to output audio;
storage means, coupled with the processor, to store one or more motions and associated actions;
a motion detecting device coupled with the processor; and
a sensing and interpretation application, coupled with the processor, to:
detect a specific type of motion with respect to the mobile communications device via the motion detecting device;
determine a current mode of the mobile communications device;
compare the detected motion against a database of motions in the storage means, where each stored motion is associated with a mode of the mobile communications device and an action to be performed by the mobile communications device;
wherein determining the current mode of the mobile communication device precedes comparing the detected motion against the database of motions in the storage means; and
upon finding a match, within tolerable limits, between the detected motion and a motion in the storage means, perform the action associated with the detected motion and the current mode of the mobile communications device.

8. The system of claim 7, where the sensing and interpretation application trains the mobile communications device to recognize a specific motion by:
selecting a mode to be associated with a specific motion;
selecting an action to be performed within the selected mode;
detecting a motion of the mobile communications device via the motion detecting device, where the motion is user defined;
associating the detected motion with the selected mode and the selected action; and
storing the associated detected motion with the selected mode and the selected action in the storage means.

9. The system of claim 7, further comprising:
a text-to-speech engine, coupled with the processor, to convert text strings associated with an action to audible output that is output by the speaker.

10. The system of claim 7, where the mode of the mobile communication device includes one of:
a phone mode,
a picture mode,
a music mode,
a game mode,
camera mode,
a contacts mode,
a settings mode, or
a null mode.

11. The system of claim 10, where the null mode acts as a superseding mode such that any motions and actions associated within the null mode supersede motions and actions in other modes.

12. The system of claim 11, where an action includes one of:
a command or instruction that can be issued by an application within the mobile communications device,
an audible output based on recorded audio file that can be output by the speaker;
an audible output based on a text-to-speech conversion that can be output by the speaker;
a visual output that can be displayed by the mobile communication device display;
a visual output that can be displayed by other lights visible on the mobile communications device, or
a mechanical output.

13. The system of claim 7, where the motion detecting device comprises an accelerometer.

14. A method of interpreting motion of a mobile communications device as input to the mobile communications device, the method comprising:
detecting a specific type of motion with respect to the mobile communications device;
determining a current mode of the mobile communications device, wherein the current mode of the mobile communications device includes one of: a phone mode, a picture mode, a music mode, a game mode, camera mode, a contacts mode, a settings mode, or a null mode;
comparing the detected motion against a stored database of motions, wherein each stored motion is associated with a mode of the mobile communications device and an action to be performed by the mobile communications device;
wherein determining the current mode of the mobile communication device precedes comparing the detected motion against the stored database of motions; and upon finding a match, within tolerable limits, between the detected motion and a motion in the stored database of motions, performing the action with the detected motion and the current mode of the mobile communication device, wherein the null mode acts as a superseding mode such that any motions and actions associated within the null mode supersede motions and actions in other modes.

15. The method of claim 14, where an action includes one of:

a command or instruction that can be issued by an application within the mobile communications device, an audible output based on a recorded audio file, an audible output based on a text-to-speech conversion, a visual output, or a mechanical output.

* * * * *